United States Patent
Hutton

(10) Patent No.: US 7,702,453 B2
(45) Date of Patent: Apr. 20, 2010

(54) SYSTEM AND METHOD FOR GUIDING AN AIRCRAFT TO A STOPPING POSITION

(75) Inventor: Neil Hutton, Ottawa (CA)

(73) Assignee: DEW Engineering and Development ULC, Ottawa, Ontario (CN)

(*) Notice: Subject to any disclaimer, the term of this patent is extended or adjusted under 35 U.S.C. 154(b) by 664 days.

(21) Appl. No.: 11/727,010

(22) Filed: Mar. 23, 2007

(65) Prior Publication Data

US 2008/0229525 A1    Sep. 25, 2008

(51) Int. Cl.
   *B64F 1/31* (2006.01)
   *G06F 19/00* (2006.01)
(52) U.S. Cl. .................. 701/120; 701/28; 701/211; 342/357.08; 348/143
(58) Field of Classification Search .............. 701/120, 701/211, 223, 16, 17, 25, 28, 301; 342/66, 342/55, 457.08; 348/119, 143; 340/937, 340/951, 953, 958, 982, 572.1; 702/151; 456/4.01
See application file for complete search history.

(56) References Cited

U.S. PATENT DOCUMENTS

| | | | |
|---|---|---|---|
| 6,100,964 A * | 8/2000 | De Cremiers | 356/4.01 |
| 6,324,489 B1 * | 11/2001 | Millg.ang.rd | 702/151 |
| 6,637,063 B1 | 10/2003 | Hutton et al. | |
| 6,742,210 B2 | 6/2004 | Hutton et al. | |
| 6,757,927 B2 | 7/2004 | Hutton et al. | |
| 6,907,635 B2 | 6/2005 | Hutton et al. | |
| 6,914,542 B2 * | 7/2005 | Hutton | 340/958 |
| 7,030,354 B2 | 4/2006 | Oki et al. | |
| 7,093,314 B2 | 8/2006 | Hutton et al. | |
| 2006/0163432 A1 | 7/2006 | McCoskey et al. | |

FOREIGN PATENT DOCUMENTS

| | | |
|---|---|---|
| EP | 0803435 A1 | 10/1997 |
| WO | WO 96/08411 A1 | 3/1996 |
| WO | WO 03/064255 A1 | 8/2003 |
| WO | WO 03/072435 A1 | 9/2003 |

OTHER PUBLICATIONS

U.S. Appl. No. 11/594,880, Hutton.
U.S. Appl. No. 11/727,009, Hutton.
U.S. Appl. No. 12/000,700, Hutton.
U.S. Appl. No. 11/157,934, Hutton.
U.S. Appl. No. 11/157,938, Hutton.
U.S. Appl. No. 11/149,401, Hutton.
U.S. Appl. No. 11/155,502, Hutton.

* cited by examiner

*Primary Examiner*—Tan Q Nguyen
(74) *Attorney, Agent, or Firm*—Freedman & Associates

(57) ABSTRACT

A method for guiding an aircraft toward a stopping position within an aircraft stand of an airport includes receiving a radio frequency (RF) signal from a radio frequency identification (RFID) tag that is carried by the aircraft. The RF signal comprises aircraft-type data that is retrievably stored in an integrated circuit of the RFID tag, the aircraft-type data being indicative of a type of the aircraft. A current location of the aircraft is sensed, and based on the aircraft-type data and the sensed current location of the aircraft, instructions are determined for guiding the aircraft from the current location thereof to a predetermined stopping position for the type of the aircraft. Using a visual docking guidance system (VDGS) associated with the aircraft stand, the instructions are displayed in human-intelligible form for being viewed by a user aboard the aircraft.

27 Claims, 7 Drawing Sheets

SYSTEM AND METHOD FOR GUIDING AN AIRCRAFT TO A STOPPING POSITION

FIELD OF THE INVENTION

The instant invention relates generally to guidance docking systems for aircraft, and more particularly to a radio frequency identification (RFID) tag-based system and method for identifying an aircraft during approach to a stopping position.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges.

Historically, the procedure for guiding an aircraft to a stopping position adjacent to the passenger boarding bridge has been time consuming and labor intensive. In general, the pilot taxis the aircraft along a lead-in line to the stopping position. Typically, the lead-in line is a physical marker that is painted onto the apron surface, and is used for guiding the aircraft along a predetermined path to the stopping position. Additional markings in the form of stop lines, different ones for different types of aircraft, are provided at predetermined positions along the lead-in line. Thus, when the nose gear of a particular type of aircraft stops precisely at the stop line for that type of aircraft, then the aircraft is known to be at its stopping position. Of course, the pilot's view of the apron surface from the cockpit of an aircraft is limited. This is particularly true for larger aircraft, such as for instance a Boeing 747-X00. Typically, in order to follow the lead-in line the pilot has relied upon instructions that are provided by a human ground marshal or guide man, together with up to two "wing walkers". Optionally, stop bars are located on a pole that is fixedly mounted to the ground surface, including appropriate stop bars for each type of aircraft that uses the gate. Alternatively, a tractor or tug is used to tow the aircraft along the lead-in line to its stopping position.

More recently, sophisticated Visual Docking Guidance Systems have been developed to perform the function of the human ground marshal or guide man and wing walkers. In particular, a Visual Docking Guidance System (VDGS) senses the aircraft as it approaches the stopping position and provides instructions to the pilot via an electronic display device. The electronic display device is mounted at a location that makes it highly visible to the pilot when viewed from the cockpit of an aircraft. Typically, the instructions include a combination of alphanumeric characters and symbols, which the pilot uses to guide the aircraft precisely to the stopping position for the particular type of aircraft. The high capital cost of the VDGS is offset by reduced labor costs and the efficiency that results from stopping the aircraft as precisely as is possible under the guidance of a human ground marshal or guide man.

One common feature of the types of VDGS that are in use today is that a sensor is provided at a position that is typically approximately aligned with the lead in-line. Typical sensors include digital still or video cameras, laser imaging devices, or infrared sensors. The sensor is used to scan an area that is adjacent to the passenger boarding bridge, so as to "look" for an approaching aircraft. Based on sensed features of the approaching aircraft, the VDGS either identifies the aircraft type or merely confirms that the aircraft type matches information that was provided previously. Once the aircraft type is confirmed, and thus the relevant stopping position is known, the sensor continues to "watch" the aircraft as it approaches the stopping position, and provides instructions to the pilot for guiding the aircraft to the stopping position. A combination of a sophisticated imaging system and a complex image data processing algorithm is required in order to ensure that the aircraft type is identified correctly, and that once identified, the trajectory of the aircraft is monitored in real time and with sufficient accuracy to enable proper parking of the aircraft. Of course, from time to time the aircraft type will be identified incorrectly, or the identified type will not agree with the information that was provided previously. In those cases, the pilot must rely upon one of the more traditional procedures for parking the aircraft discussed supra. In addition, unfavorable environmental conditions such as fog, heavy rain, snow etc. may render the imager of the VDGS ineffective. Under such unfavorable conditions, the pilot must once again rely upon one of the more traditional procedures for parking the aircraft discussed supra.

Accordingly, there exists an unfulfilled need for a system and method for identifying and guiding an aircraft to a stopping position. There furthermore exists an unfulfilled need for such a system and method, which provides reliable operation even under unfavorable environmental conditions such as fog, heavy rain, snow etc., and that reduces the potential for incorrectly identifying the aircraft type to be parked.

SUMMARY OF EMBODIMENTS OF THE INVENTION

In accordance with an aspect of the instant invention there is provided a method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising: receiving a radio frequency (RF) signal from a radio frequency identification (RFID) tag that is carried by the aircraft, the RF signal comprising aircraft-type data that is retrievably stored in an integrated circuit of the RFID tag, the aircraft-type data being indicative of a type of the aircraft; sensing a current location of the aircraft; based on the aircraft-type data and the sensed current location of the aircraft, determining instructions for guiding the aircraft from the current location thereof to a predetermined stopping position for the type of the aircraft; and, using the VDGS, displaying the instructions in human-intelligible form for being viewed by a user aboard the aircraft.

In accordance with another aspect of the instant invention there is provided a method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising: providing a radio frequency identification (RFID) reader proximate an aircraft engaging end of the passenger boarding bridge; positioning the passenger boarding bridge to an interrogation position, so as to define an interrogation region along a portion of an aircraft approach route to the aircraft stand; subsequent to the aircraft entering the interrogation region, interrogating a RFID tag that is carried by the aircraft so as to obtain aircraft-type data that is stored in an integrated circuit of the RFID tag, the aircraft-type data being indicative of a type of the aircraft; determining instructions for guiding the aircraft from the interrogation region to a target stopping position for the type of the aircraft; and, using the VDGS, displaying the instructions in human-intelligible form for being viewed by a user aboard the aircraft.

In accordance with another aspect of the instant invention there is provided a system for guiding an aircraft toward a stopping position within an aircraft stand of an airport, there being associated with the aircraft stand a passenger boarding bridge for supporting passenger loading and unloading operations, comprising: a visual docking guidance system (VDGS) including a display portion for displaying instructions in human intelligible form for being viewed by a user aboard the aircraft; and, a radio frequency identification (RFID) reader disposed in communication with the VDGS for receiving a radio frequency (RF) signal from a RFID tag that is carried by an aircraft during approach of the aircraft toward the aircraft stand, the RF signal comprising aircraft-type data relating to the type of the aircraft, and the RFID reader for providing to the VDGS a signal relating to the aircraft-type data.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

Figure 1:
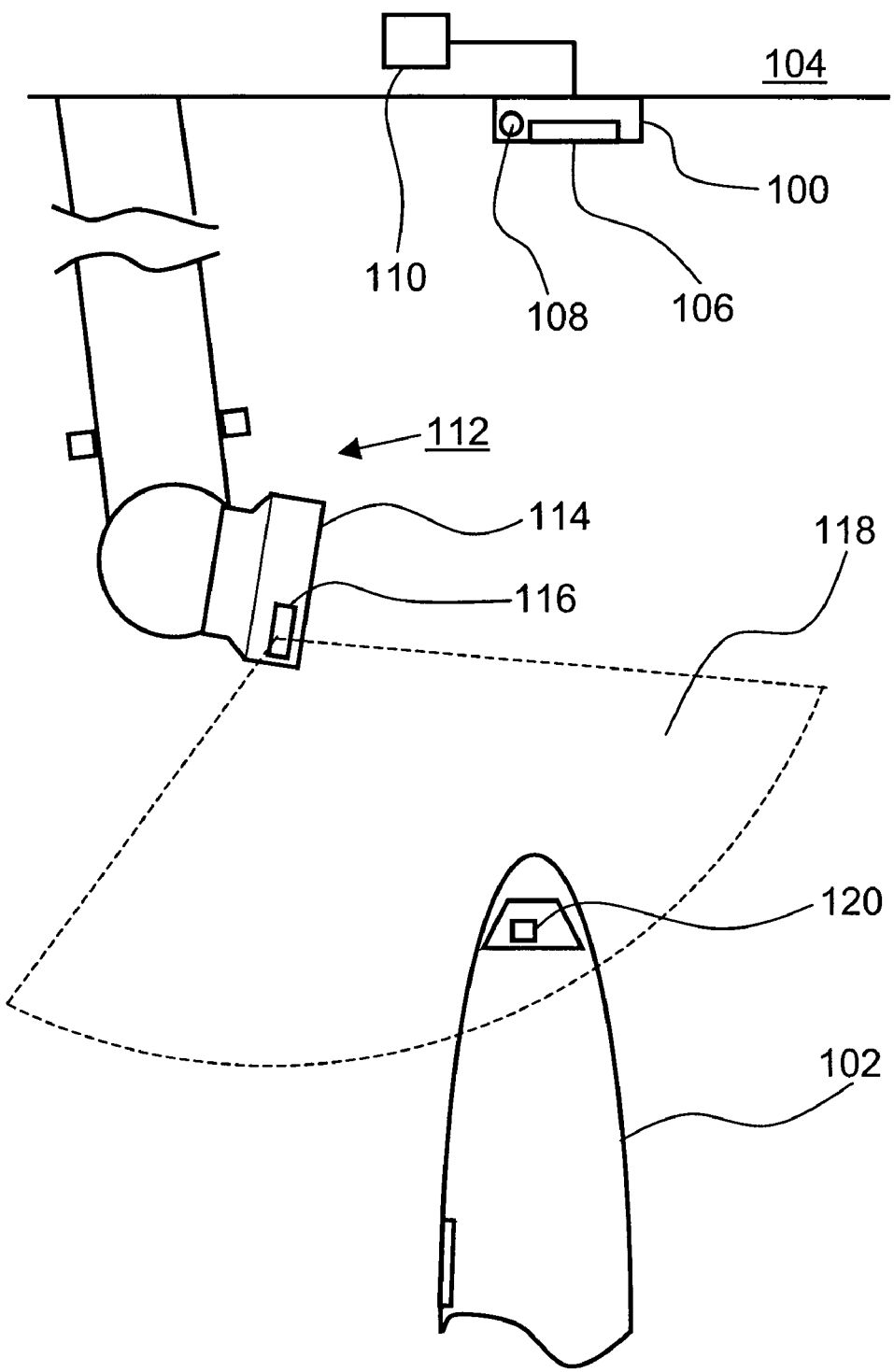
FIG. 1 is a simplified diagram showing a system according to an embodiment of the instant invention.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

In recent years there has been a trend toward decreasing aircraft turn-around times, particularly on scheduled domestic routes. Economics is the primary force that has been driving this trend; stated simply the aircraft does not create profit for the airline as long as it is on the ground. Accordingly, new ways have been developed for guiding the aircraft into the aircraft stand and for aligning a passenger boarding bridge with the doorway of the aircraft in as short a period of time as is possible. Typically, automated systems and methods have been implemented to speed up the process of unloading and loading passengers, while at the same time reducing the number of ramp personnel that are involved in the process. One problem that is associated with automated systems relates to reliability of operation and the costs that result when unexpected failures occur. For instance a modern visual docking guidance system (VDGS) in use at an airport replaces up to three ramp personnel including a human ground marshal, or guide man, and two wing walkers. The ability of the VDGS to guide an aircraft into the aircraft stand relies on an accurate determination of the aircraft-type being achieved. When an accurate determination of the aircraft-type is not achieved, a delay occurs and in some cases it is necessary to proceed in a manual fashion. Such delays not only increase costs, but also inconvenience passengers and may result in connecting flights being missed, etc.

According to at least one embodiment of the instant invention a radio frequency identification (RFID) reader is provided in communication with a VDGS, which is in turn associated with an aircraft stand including a passenger boarding bridge of known configuration. Each aircraft carries a RFID tag, which optionally is one of a passive, semi-passive and active RFID tag. Aircraft-type data, relating to the type of the aircraft that carries a particular RFID tag, is stored within an integrated circuit of the RFID tag. In order to facilitate discussion, and by way of a specific and non-limiting example, it has been assumed that passive RFID tags are used with the disclosed embodiments of the instant invention. That being said, it is to be clearly understood that where regulatory and other considerations allow their use, semi-passive and active tags are also envisaged for use with the disclosed embodiments of the instant invention.

Referring now to FIG. 1, shown is a schematic illustration of a system according to an embodiment of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102 and a sensor 108 for sensing aircraft 102 during approach thereof toward the aircraft stand. By way of several non-limiting examples, the sensor 108 is one of a laser range finder, an infrared sensor, a digital still camera and a digital video camera. The VDGS 100 is in communication with a database 110 having stored therein a target stopping position for each different type of aircraft that is serviced at the aircraft stand.

Referring still to FIG. 1, a passenger boarding bridge 112 is shown extending between terminal building 104 and an aircraft-engaging end including a pivotable cabin 114. Disposed proximate the aircraft-engaging end, such as for instance within cabin 114, is a radio frequency identification (RFID) tag reader 116. The RFID tag reader 116 includes not illustrated antenna, transceiver and decoder components for receiving radio frequency (RF) signals that originate within an interrogation region 118 adjacent to the aircraft engaging end of passenger boarding bridge 112. An RFID tag 120 is disposed aboard aircraft 102. The RFID tag 120 includes an integrated circuit for storing at least aircraft-type data relating to the type of the aircraft 102, and an antenna element for use in transmitting an RF signal that is encoded with the aircraft-type data. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region as soon as possible during the aircraft approach to the aircraft stand. This allows the RFID tag 120 to be interrogated while the aircraft is as far away as possible from the stopping position. The specific configuration and operating principles of RFID systems are well known, and the details mostly are omitted from this discussion in the interest of clarity.

Figure 2:
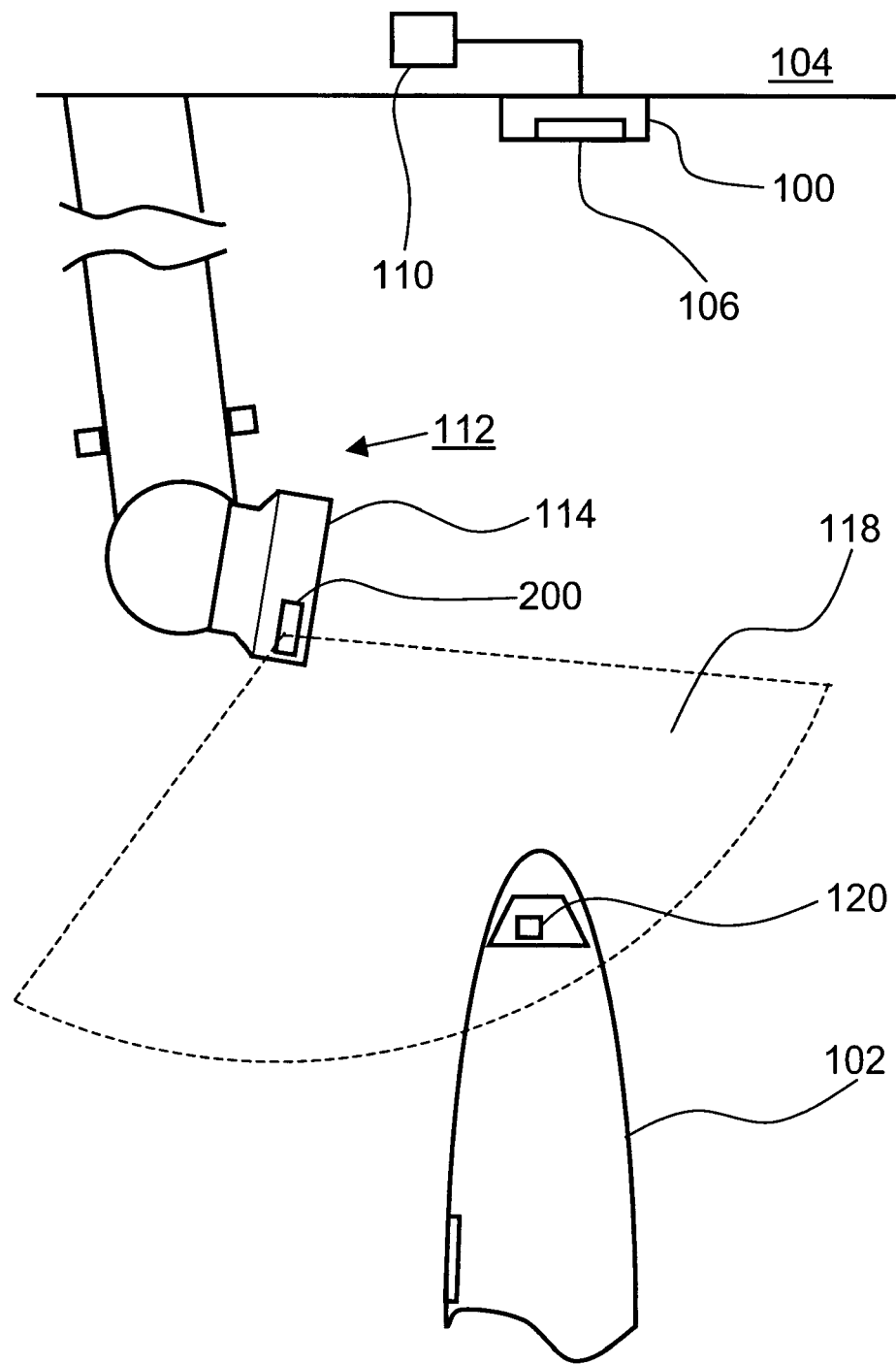
FIG. 2 is a simplified diagram showing a system according to an embodiment of the instant invention.

Referring now to FIG. 2, shown is a schematic illustration of a system according to an embodiment of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102. The VDGS 100 is in communication with a database 110 having stored therein a target stopping position for each different type of aircraft that is serviced at the aircraft stand.

Referring still to FIG. 2, a passenger boarding bridge 112 is shown extending between terminal building 104 and an aircraft-engaging end including a pivotable cabin 114. Disposed proximate the aircraft-engaging end, such as for instance within cabin 114, is a radio frequency identification (RFID) tag reader 200. The RFID tag reader 200 includes not illustrated directional antenna array, transceiver and decoder components for receiving RF signals that originate within an interrogation region 118 adjacent to the aircraft engaging end of passenger boarding bridge 112. An RFID tag 120 is disposed aboard aircraft 102. The RFID tag 120 includes an integrated circuit for storing at least aircraft-type data relating to the type of the aircraft 102, and an antenna element for use in transmitting an RF signal that is encoded with the aircraft-type data. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region as soon as possible during the aircraft approach to the aircraft stand. This allows the RFID tag 120 to be interrogated while the aircraft is as far away as possible from the stopping position. The specific configuration and operating principles of RFID systems are well known, and the details mostly are omitted from this discussion in the interest of clarity.

During use, the location of aircraft 102 is sensed using RFID reader 200. For instance, an angle of arrival of the RF signal that is transmitted from the RFID tag 120 in response to it being interrogated is determined, based on differences in the RF signal that is received at each of a plurality of antenna elements of the RFID reader 200. Distance information between the RFID reader 200 and tag 120 are determined based upon an intensity of the RF signal that is received at each one of the plurality of antenna elements of the RFID reader 200. The current position of the aircraft 102 relative to the target stopping position is determined based on the angle and distance between the RFID reader 200 and RFID tag 120, and the known position of RFID reader 200 relative to the target stopping position. Optionally, the passenger boarding bridge 112 is positioned to a same orientation prior to each aircraft arrival, such that the position of the RFID reader 200 is the same during each aircraft approach. Further optionally, transducers or other bridge-mounted sensors are utilized for determining a current orientation of the passenger boarding bridge 112, and thus the current position of the RFID reader 200, during each aircraft approach. Further optionally, another sensor such as for instance a not illustrated laser range finder is used to determine the distance information.

Figure 3:
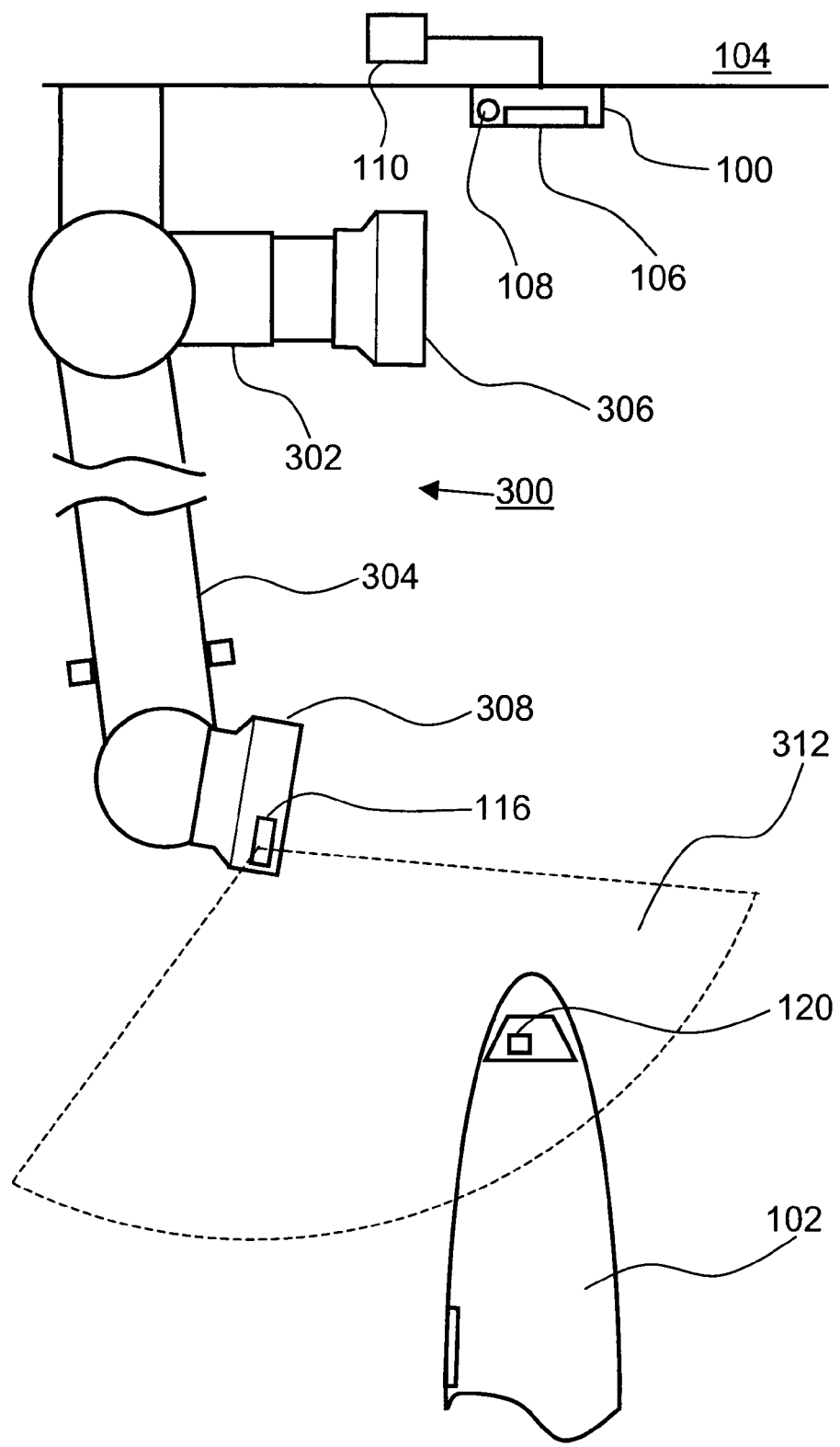
FIG. 3 is a simplified diagram showing a system according to an embodiment of the instant invention.

Referring now to FIG. 3, shown is a system according to an embodiment of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102 and a sensor 108 for sensing aircraft 102 during approach thereof toward the aircraft stand. By way of several non-limiting examples, the sensor 108 is one of a laser range finder, an infrared sensor, a digital still camera and a digital video camera. The VDGS 100 is in communication with a database 110 having stored therein a target stopping position for each different type of aircraft that is serviced at the aircraft stand.

Referring still to FIG. 3, a passenger boarding bridge 300 including a nose-loader portion 302 and an over-the-wing (OTW) portion 304 is shown. The nose loader portion 302 ends at an aircraft-engaging cabin 306 and the OTW portion 304 ends at a pivotable cabin 308. Disposed proximate the aircraft-engaging end of the OTW portion 304, such as for instance within cabin 308, is a radio frequency identification (RFID) tag reader 116. The RFID tag reader 116 includes not illustrated antenna, transceiver and decoder components for receiving radio frequency (RF) signals that originate within an interrogation region 312 adjacent to the aircraft engaging end of the OTW portion 304. An RFID tag 120 is disposed aboard aircraft 102. The RFID tag 120 includes an integrated circuit for storing at least aircraft-type data relating to the type of aircraft 102, and an antenna element for use in transmitting an RF signal that is encoded with the aircraft-type data. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region 312 as soon as possible during the aircraft approach to the aircraft stand. This allows the RFID tag 120 to be interrogated while the aircraft is as far away as possible from the stopping position. For the same reason, the RFID tag reader 116 is disposed within cabin 308 of the OTW portion 304, such that the interrogation region 312 is shifted as far away from the terminal building 104 as is possible. The specific configuration and operating principles of RFID systems are well known, and the details mostly are omitted from this discussion in the interest of clarity.

Optionally, the sensor 108 in the system of in FIG. 3 is omitted and a directional RFID reader 200 replaces the RFID reader 116. In this optional configuration the RFID reader 200 is used to sense angular and distance information in manner that is analogous to that which was described with reference to FIG. 2 above.

Figure 4:
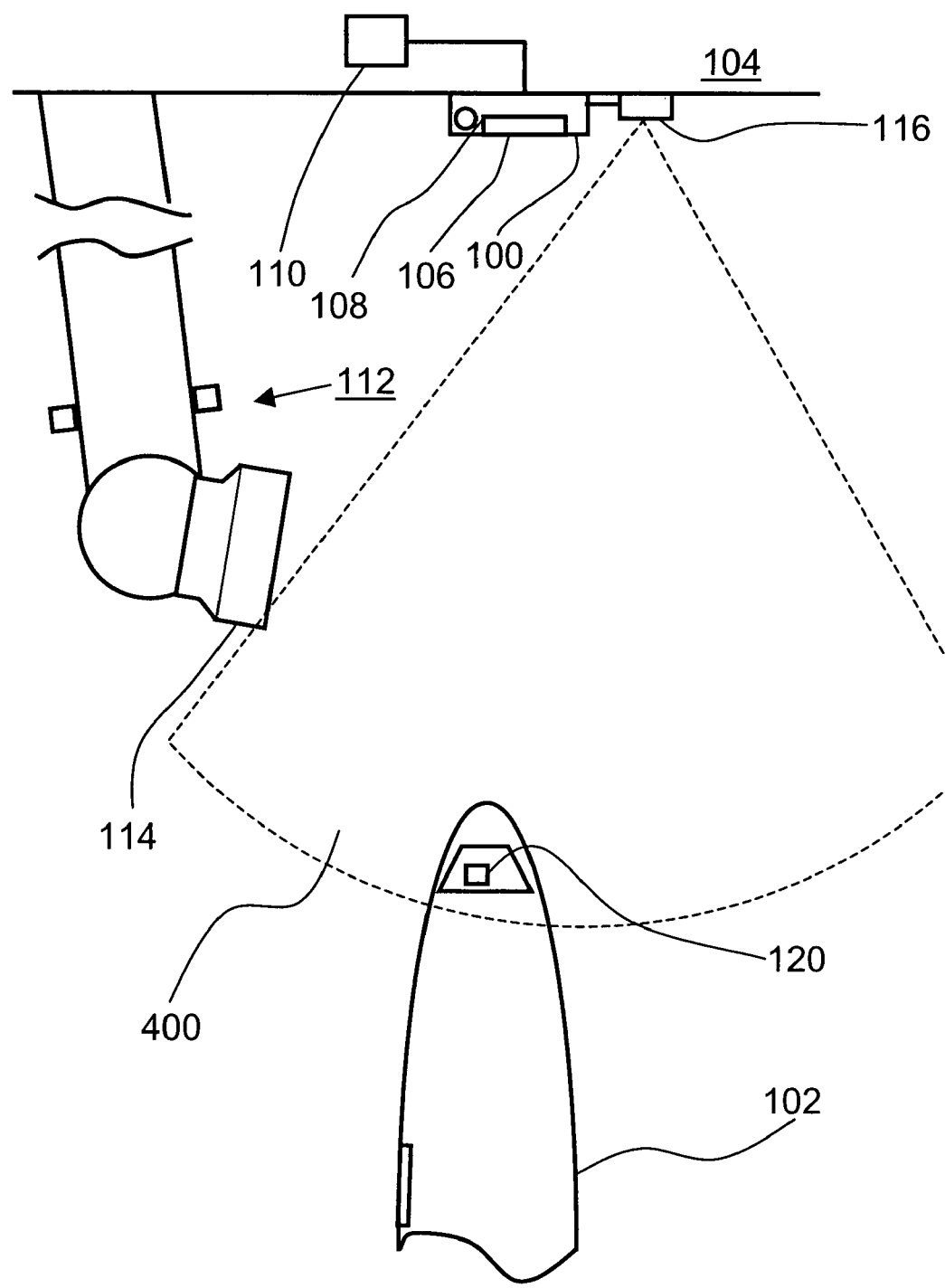
FIG. 4 is a simplified diagram showing a system according to an embodiment of the instant invention.

Referring now to FIG. 4, shown is a schematic illustration of a system according to an embodiment of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102 and a sensor 108 for sensing aircraft 102 during approach thereof toward the aircraft stand. By way of several non-limiting examples, the sensor 108 is one of a laser range finder, an infrared sensor, a digital still camera and a digital video camera. The VDGS 100 is in communication with a database 110 having stored therein a target stopping position for each different type of aircraft that is serviced at the aircraft stand.

Disposed adjacent the VDGS 100 and in communication therewith is a radio frequency identification (RFID) tag reader 116. The RFID tag reader 116 includes not illustrated antenna, transceiver and decoder components for receiving radio frequency (RF) signals that originate within an interrogation region 400 in front of the VDGS 100. An RFID tag 120 is disposed aboard aircraft 102. The RFID tag 120 includes an integrated circuit for storing at least aircraft-type data relating to the type of the aircraft 102, and an antenna element for use in transmitting an RF signal that is encoded with the aircraft-type data. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region as soon as possible during the aircraft approach to the aircraft stand. This allows the RFID tag 120 to be interrogated while the aircraft is as far away as possible from the stopping position. The specific configuration and operating principles of RFID systems are well known, and the details mostly are omitted from this discussion in the interest of clarity.

Referring still to FIG. 4, a passenger boarding bridge 112 is shown extending between terminal building 104 and an aircraft-engaging end including a pivotable cabin 114. After the aircraft 102 stops at the target stopping position, the pivotable cabin 114 is aligned with a doorway of the aircraft 102 in one of a manual, semi-automated and automated fashion.

Figure 5:
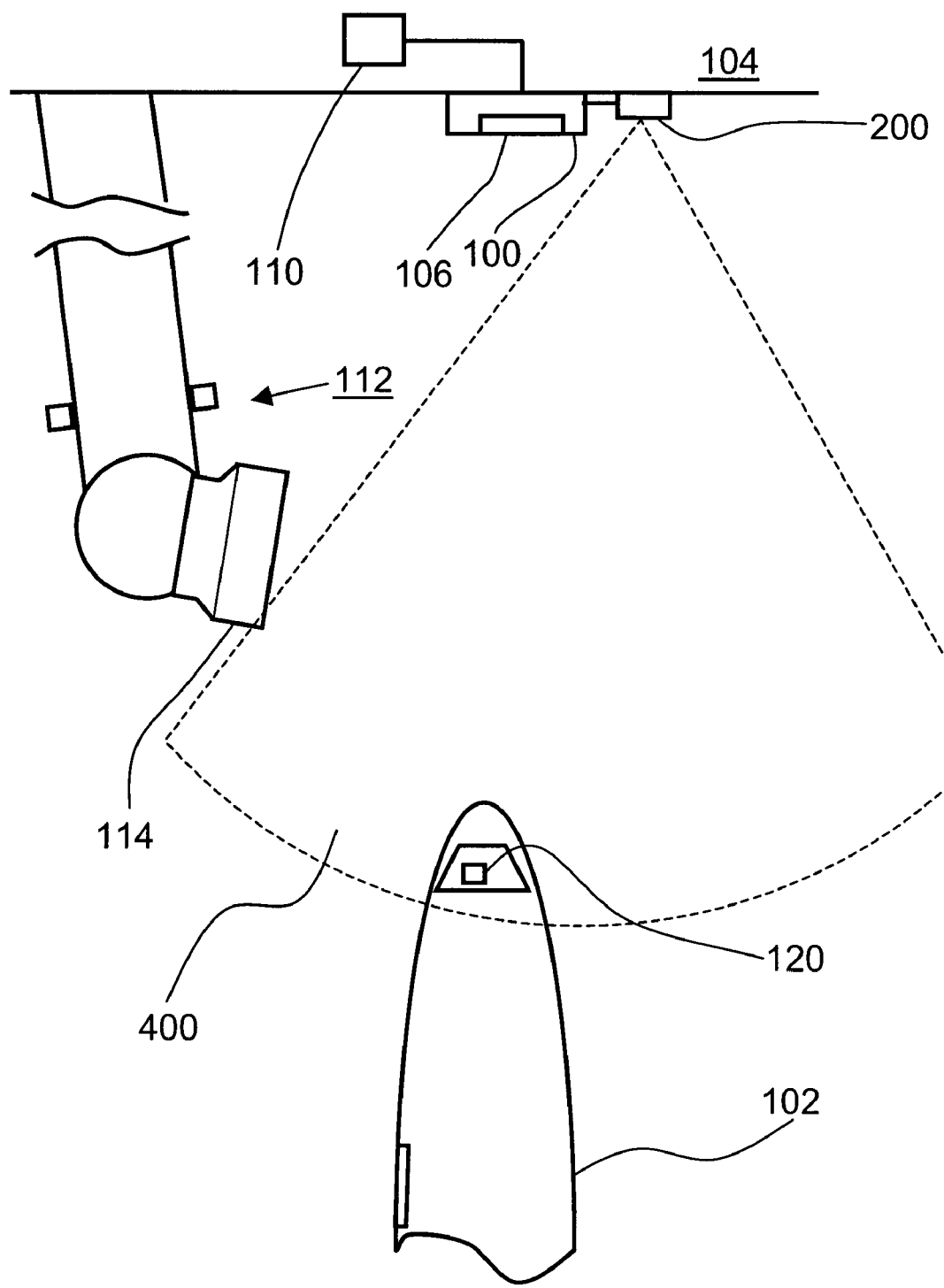
FIG. 5 is a simplified diagram showing a system according to an embodiment of the instant invention.

Referring now to FIG. 5, shown is a schematic illustration of a system according to an embodiment of the instant invention. A visual guidance docking system 100 is mounted at a location that is within the field of view of a pilot aboard an aircraft 102. For instance, the VDGS 100 is fixedly mounted to an outside wall surface of an airport terminal building 104, at a location that is approximately aligned with a not illustrated aircraft lead-in line of the aircraft stand. The VDGS 100 includes a display portion 106 for displaying instructions to the pilot aboard aircraft 102. The VDGS 100 is in communication with a database 110 having stored therein a target stopping position for each different type of aircraft that is serviced at the aircraft stand.

Disposed adjacent the VDGS 100 and in communication therewith is a radio frequency identification (RFID) tag reader 200. The RFID tag reader 200 includes not illustrated directional antenna array, transceiver and decoder components for receiving RF signals that originate within an interrogation region 400 in front of the VDGS 100. An RFID tag 120 is disposed aboard aircraft 102. The RFID tag 120 includes an integrated circuit for storing at least aircraft-type data relating to the type of the aircraft 102, and an antenna element for use in transmitting an RF signal that is encoded with the aircraft-type data. The RFID tag 120 preferably is disposed proximate the nose end of aircraft 102, such as for instance mounted to the cockpit windscreen or mounted to a surface of the nose landing-gear. Positioning the RFID tag 120 close to the nose of the aircraft 102 ensures that the RFID tag enters the interrogation region as soon as possible during the aircraft approach to the aircraft stand. This allows the RFID tag 120 to be interrogated while the aircraft is as far away as possible from the stopping position. The specific configuration and operating principles of RFID systems are well known, and the details mostly are omitted from this discussion in the interest of clarity.

During use, the location of aircraft 102 is sensed using RFID reader 200. For instance, an angle of arrival of the RF signal that is transmitted from the RFID tag 120 in response to it being interrogated is determined, based on differences in the RF signal that is received at each of a plurality of antenna elements of the RFID reader 200. Distance information between the RFID reader 200 and tag 120 are determined based upon an intensity of the RF signal that is received at each one of the plurality of antenna elements of the RFID reader 200. The current position of the aircraft 102 relative to the target stopping position is determined based on the angle and distance between the RFID reader 200 and RFID tag 120, and the known position of RFID reader 200 relative to the target stopping position. Optionally, another sensor such as for instance a not illustrated laser range finder is used to determine the distance information.

Referring still to FIG. 5, a passenger boarding bridge 112 is shown extending between terminal building 104 and an aircraft-engaging end including a pivotable cabin 114. After the aircraft 102 stops at the target stopping position, the pivotable cabin 114 is aligned with a doorway of the aircraft 102 in one of a manual, semi-automated and automated fashion.

Of course, different types of RFID tags are known in the art. "Passive RFID tags" are radio frequency identification devices that do not have any internal power source. Their energy source is the power emitted from adjacent antennas such as for instance RFID tag reader 116. Passive tags have shorter read ranges than active tags (discussed below) and require a higher-powered reader. Read-only tags are typically passive and are programmed with a unique set of data (usually 32 to 128 bits) that cannot be modified. Semi-passive tags use a battery to run the chip's circuitry, but communicate by drawing power from the RFID tag reader. Active RFID tags are powered by an internal battery and are typically read/write, i.e., tag data can be rewritten and/or modified. An active tag's memory size varies according to application requirements; some systems operate with up to 1 MB of memory. The battery-supplied power of an active tag generally gives it a longer read range.

Passive RFID tags are currently approved for use on aircraft, provided that certain criteria are satisfied. In particular, the tags must operate in the "passive-only" mode. Currently, it is also required that the tags must not reflect back ambient RF energy of 35 decibels referenced to 1 microvolt per meter. This criterion must be satisfied to ensure that the tags do not pick up energy emitted by the engines or other devices, reflect it back and possibly interfere with aircraft systems. Furthermore, the frequency used by the tags must be outside the published aviation frequency bands to prevent interference with aircraft systems. The most common RFID frequencies—2.45 GHz, 915 MHz and 13.56 MHz—do not overlap with any frequencies used in aviation and are acceptable for use with the systems and methods according to the instant invention. Finally, passive tags must be interrogated only on the ground when the aircraft is not in operation, and must function properly when installed and be designed "to operate in an aircraft operational environment with robust radio frequency stability." The methods according to the embodiments of the instant invention require interrogation of the tags while the aircraft is on the ground but still moving toward the aircraft stand. Accordingly, prior to implementing the methods that are described in the following paragraphs it may be necessary to confirm current regulatory requirements relating to operation of passive RFID tags on aircraft, and seek amendments thereto if necessary.

Active and semi-passive RFID tags currently are not approved for use on aircraft, but approval for their use is being sought at this time and it is reasonable to anticipate that such approval will be granted in the near future. Accordingly, in the discussion that follows it is assumed that the RFID tag 120 is a passive RFID tag and that the RFID tag reader 116 or 200 is of sufficiently high power to read a passive RFID tag that is disposed aboard an aircraft during approach of the aircraft to a stopping position within the aircraft stand. That being said, the methods according to embodiments of the instant invention optionally are implemented using active RFID tags or semi-passive RFID tags where regulatory approval permits their use on an aircraft. It is to be understood that when active or semi-passive RFID tags are disposed aboard the aircraft, a suitable RFID tag reader is also provided.

The methods according to the various embodiments of the instant invention are readily implemented using existing VDGS systems of the type that are already installed in connection with either a manual or an automated passenger boarding bridge at an airport. Providing an RFID tag reader 116 or 200 in communication with the VDGS 100 is considered to be a necessary retrofit. As discussed supra the RFID tag reader 116 or 200 optionally is disposed aboard the passenger boarding bridge or is mounted to a surface of a terminal building or on a separate stand or structure. Positioning of the RFID tag reader 116 is done such that an interrogation region is defined along a path that is followed by aircraft during approach to the aircraft stand.

Figure 6:
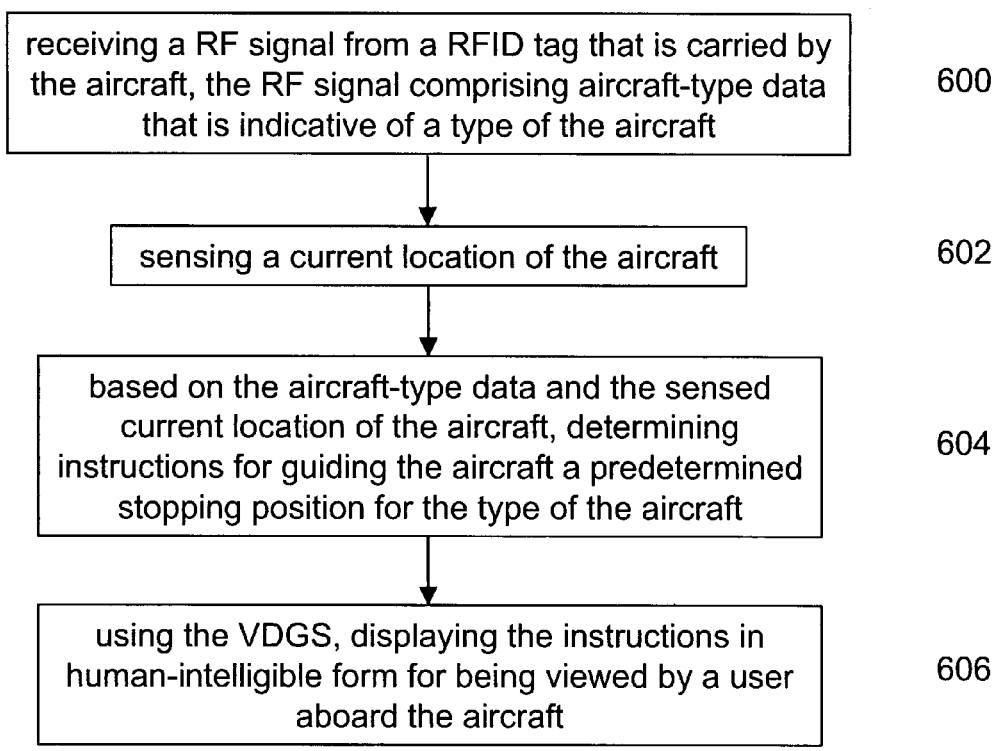
FIG. 6 is a simplified flow diagram for a method according to an embodiment of the instant invention; and, FIG. 7 is a simplified flow diagram for a method according to an embodiment of the instant invention.

Referring now to FIG. 6, shown is a simplified flow diagram for a method of guiding an aircraft toward a stopping position within an aircraft stand of an airport according to an embodiment of the instant invention. At step 600 a radio frequency (RF) signal is received from a radio frequency identification (RFID) tag that is carried by the aircraft. For instance, as the aircraft 102 approaches the aircraft stand, RFID tag reader 116 or 200 is used to interrogate RFID tag 120 carried by the aircraft 102, after RFID tag 120 moves into the interrogation region 118, 312 or 400. In response to being interrogated the RFID tag 120 returns the RF signal, which is modulated or encoded with data relating to the actual aircraft-type of the aircraft 102. In particular, the aircraft-type data is retrievably stored in an integrated circuit of the RFID tag 120. At step 602 a current location of the aircraft is sensed. Optionally, the sensor 108 of VDGS 100 or a directional RFID reader 200 is used to sense the current location of the aircraft 102. Based on the aircraft-type data and the sensed current location of the aircraft 102, instructions are determined at step 604 for guiding the aircraft from the current location thereof to a predetermined stopping position for the type of the aircraft. Using the VDGS the instructions are displayed at step 606, in human-intelligible form, for being viewed by a user aboard the aircraft. The instructions are displayed, typically in the form of arrows, distance indicators, and alphanumeric commands or information displays, for instance using the display portion 106 of VDGS 100.

Figure 7:
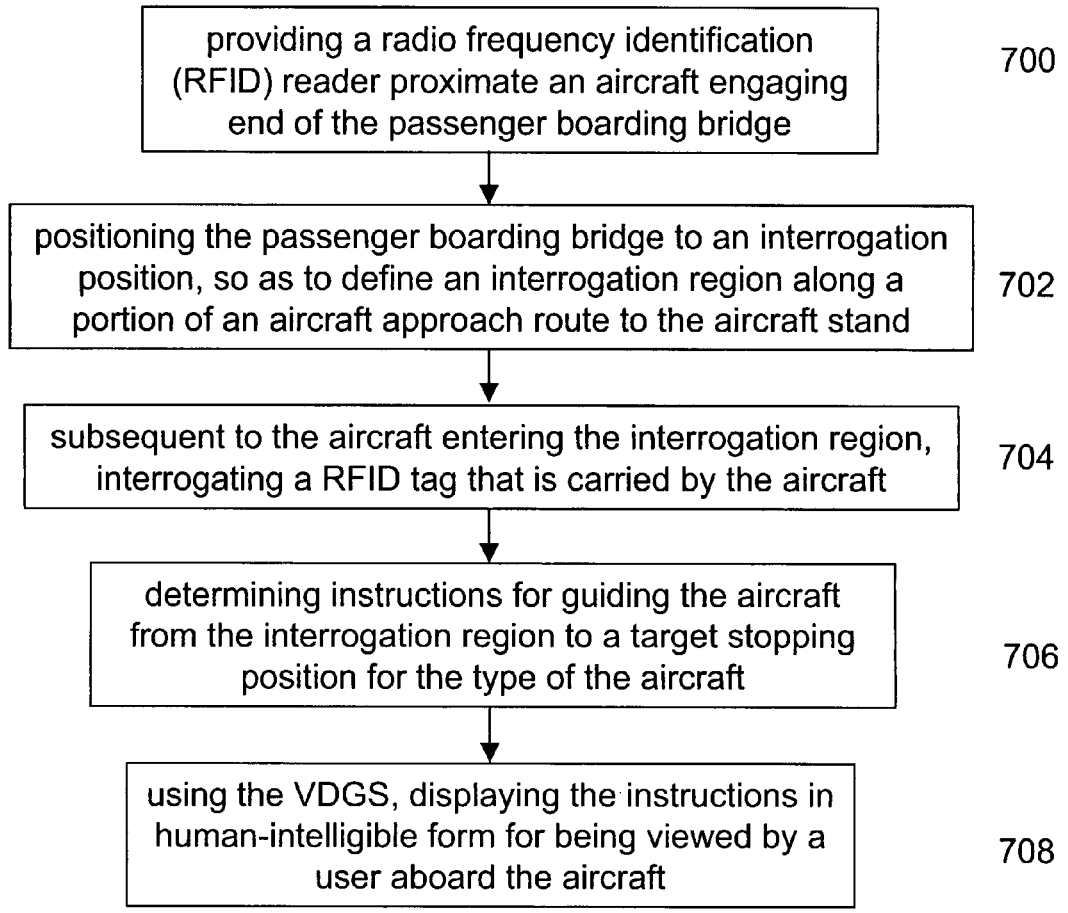

Referring now to FIG. 7, shown is a simplified flow diagram for a method of guiding an aircraft toward a stopping position within an aircraft stand of an airport according to an embodiment of the instant invention. At step 700 a radio frequency identification (RFID) reader is provided proximate an aircraft engaging end of the passenger boarding bridge. At step 702 the passenger boarding bridge is positioned to an interrogation position, so as to define an interrogation region along a portion of an aircraft approach route to the aircraft stand. Subsequent to the aircraft entering the interrogation region, a RFID tag that is carried by the aircraft is interrogated at step 704 so as to obtain aircraft-type data that is stored in an integrated circuit of the RFID tag, the aircraft-type data being indicative of a type of the aircraft. At step 706 instructions are determined for guiding the aircraft from the interrogation region to a target stopping position for the type of the aircraft. At step 708 the VDGS is used for displaying the instructions in human-intelligible form for being viewed by a user aboard the aircraft.

Numerous other embodiments may be envisaged without departing from the spirit and scope of the invention.

What is claimed is:

1. A method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising:

receiving a radio frequency (RF) signal from a radio frequency identification (RFID) tag that is carried by the aircraft, the RF signal comprising aircraft-type data that is retrievably stored in an integrated circuit of the RFID tag, the aircraft-type data being indicative of a type of the aircraft;

sensing a current location of the aircraft;

based on the aircraft-type data and the sensed current location of the aircraft, determining instructions for guiding the aircraft from the current location thereof to a predetermined stopping position for the type of the aircraft; and, using the VDGS, displaying the instructions in human-intelligible form for being viewed by a user aboard the aircraft.

2. A method according to claim 1, wherein the RF signal is received using a RFID reader disposed at a location that is remote from the aircraft, the RFID reader being in communication with the VDGS of the aircraft stand.

3. A method according to claim 2, wherein the RFID reader comprises a directional antenna array comprising a plurality of antenna elements, and wherein sensing a current location of the aircraft comprises determining an angle of arrival of the RF signal, the angle of arrival being determined based on differences in the RF signal received at each of the plurality of antenna elements.

4. A method according to claim 3, wherein sensing a current location of the aircraft comprises determining distance information based upon an intensity of the RF signal that is received at each one of the plurality of antenna elements.

5. A method according to claim 3, wherein sensing a current location of the aircraft comprises determining distance information using a laser range finder.

6. A method according to claim 1, comprising stopping the aircraft at the stopping position in dependence upon the displayed instructions.

7. A method according to claim 1, comprising providing the RFID tag aboard the aircraft.

8. A method according to claim 7, wherein the RFID tag is a passive RFID tag, and comprising interrogating the passive RFID tag prior to receiving the RF signal therefrom.

9. A method according to claim 8, wherein the RFID tag is interrogated using a RFID reader disposed proximate an aircraft-engaging end of the passenger boarding bridge, and comprising positioning the aircraft-engaging end of the passenger boarding bridge to a interrogation position prior to interrogating the RFID tag.

10. A method for guiding an aircraft toward a stopping position within an aircraft stand of an airport, there being associated with the aircraft stand a passenger boarding bridge for supporting passenger loading and unloading operations and a visual docking guidance system (VDGS) for displaying instructions for guiding the aircraft toward a stopping position, the method comprising:

provide a radio frequency identification (RFID) reader proximate an aircraft engaging end of the passenger boarding bridge;

positioning the passenger boarding bridge to an interrogation position, so as to define an interrogation region along a portion of an aircraft approach route to the aircraft stand;

subsequent to the aircraft entering the interrogation region, interrogating a RFID tag that is carried by the aircraft so as to obtain aircraft-type data that is stored in an integrated circuit of the RFID tag, the aircraft-type data being indicative of a type of the aircraft;

determining instructions for guiding the aircraft from the interrogation region to a target stopping position for the type of the aircraft; and, using the VDGS, displaying the instructions in human-intelligible form for being viewed by a user aboard the aircraft.

11. A method according to claim 10, comprising providing the RFID tag aboard the aircraft.

12. A method according to claim 10, comprising stopping the aircraft at the target stopping position in dependence upon the displayed instructions.

13. A method according to claim 10, wherein the target stopping position for the aircraft is determined based on the aircraft-type data.

14. A method according to claim 10, comprising sensing a current location of the aircraft prior to determining instructions for guiding the aircraft from the interrogation region to the target stopping position.

15. A method according to claim 14, wherein the instructions are determined based on the aircraft-type data and the sensed current location of the aircraft.

16. A method according to claim 15, wherein the RFID reader comprises a directional antenna array comprising a plurality of antenna elements, and wherein sensing a current location of the aircraft comprises determining an angle of arrival of a RF signal that is transmitted from the RFID tag in response to being interrogated, the angle of arrival being determined based on differences in the RF signal received at each of the plurality of antenna elements.

17. A method according to claim 16, wherein sensing a current location of the aircraft comprises determining distance information based upon an intensity of the RF signal that is received at each one of the plurality of antenna elements.

18. A method according to claim 16, wherein sensing a current location of the aircraft comprises determining distance information using a laser range finder.

19. A system for guiding an aircraft toward a stopping position within an aircraft stand of an airport, there being associated with the aircraft stand a passenger boarding bridge for supporting passenger loading and unloading operations, comprising:

a visual docking guidance system (VDGS) including a display portion for displaying instructions in human intelligible form for being viewed by a user aboard the aircraft; and, a radio frequency identification (RFID) reader disposed in communication with the VDGS for receiving a radio frequency (RF) signal from a RFID tag that is carried by an aircraft during approach of the aircraft toward the aircraft stand, the RF signal comprising aircraft-type data relating to the type of the aircraft, and the RFID reader for providing to the VDGS a signal relating to the aircraft-type data.

20. A system according to claim 19, wherein the RFID reader is disposed proximate an aircraft engaging end of the passenger boarding bridge.

21. A system according to claim 19, comprising a RFID tag disposed aboard the, the RFID tag comprising an integrated circuit for retrievably storing the aircraft-type data therein.

22. A system according to claim 21, wherein the RFID tag is a passive RFID tag.

23. A system according to claim 21, wherein the RFID tag is a semi-passive RFID tag.

24. A system according to claim 21, wherein the RFID tag is an active RFID tag.

25. A system according to claim 19, wherein the RFID reader comprises a directional antenna.

26. A system according to claim 25, wherein the directional antenna comprises a plurality of antenna elements.

27. A system according to claim 26, wherein the plurality of antenna elements comprises at least four RF antenna elements.

* * * * *